US007622697B2

(12) United States Patent
Korcharz et al.

(10) Patent No.: US 7,622,697 B2
(45) Date of Patent: Nov. 24, 2009

(54) BRIGHTNESS CONTROL FOR DYNAMIC SCANNING BACKLIGHT

(75) Inventors: Dror Korcharz, Bat Yam (IL); Arkadiy Peker, New Hyde Park, NY (US); Alon Ferentz, Bat Yam (IL); Roni Blaut, Netanya (IL); Migel Jacubovski, Hod Hasharon (IL)

(73) Assignee: Microsemi Corp. - Analog Mixed Signal Group Ltd., Hod Hasharon (IL)

( * ) Notice: Subject to any disclaimer, the term of this patent is extended or adjusted under 35 U.S.C. 154(b) by 0 days.

(21) Appl. No.: 12/136,092

(22) Filed: Jun. 10, 2008

(65) Prior Publication Data

US 2009/0001252 A1 Jan. 1, 2009

Related U.S. Application Data

(60) Provisional application No. 60/946,147, filed on Jun. 26, 2007, provisional application No. 60/954,338, filed on Aug. 7, 2007.

(51) Int. Cl.
*G01J 1/32* (2006.01)

(52) U.S. Cl. ....................................... 250/205; 348/687

(58) Field of Classification Search ................. 250/205, 250/201.1; 353/85, 88, 97, 121; 348/673, 348/687

See application file for complete search history.

(56) References Cited

U.S. PATENT DOCUMENTS 4,064,530 A 12/1977 Kaiser et al.
4,695,885 A 9/1987 Kim
5,387,921 A 2/1995 Zhang et al.
5,717,978 A 2/1998 Mestha
6,127,783 A 10/2000 Pashley et al.
6,194,839 B1 2/2001 Chang
6,201,353 B1 3/2001 Chang et al.

(Continued)

FOREIGN PATENT DOCUMENTS

WO 2004084170 A1 9/2004

(Continued)

OTHER PUBLICATIONS

Perduijn et al; “Light Output Feedback Solution for RGB LED Backlight Application”; SID 00 Digest; 2000; pp. 1-3; The Society for Information Display, San Jose, California.

(Continued)

*Primary Examiner*—Seung C Sohn
(74) *Attorney, Agent, or Firm*—Simon Kahn

(57) ABSTRACT

A method of controlling the luminance of a luminaire on an individual frame basis, without affecting a slow acting color loop controlling the color temperature of the luminaire, the method comprising: receiving a reference value representative of a target color; receiving a luminance signal defining the luminance of the luminaire per frame; adjusting a modulated signal driving the luminaire directly responsive to the received luminance signal, thereby controlling the luminance of the luminaire per frame; sampling the optical output of the luminaire per frame; comparing a value responsive to the sampled optical output with a value responsive to the received reference value to output a difference signal; and further adjusting the modulated signal driving the luminaire responsive to the compared value so as to reduce the difference signal.

21 Claims, 3 Drawing Sheets

U.S. PATENT DOCUMENTS

| | | | |
|---|---|---|---|
| 6,373,964 | B1 | 4/2002 | Geissler et al. |
| 6,411,046 | B1 | 6/2002 | Muthu |
| 6,441,558 | B1 | 8/2002 | Muthu |
| 6,521,879 | B1 | 2/2003 | Rand et al. |
| 6,576,881 | B2 | 6/2003 | Muthu |
| 6,611,249 | B1 | 8/2003 | Evanicky et al. |
| 6,624,847 | B1 | 9/2003 | Abdellatif |
| 6,870,525 | B2 | 3/2005 | Kawabata et al. |
| 6,894,442 | B1 | 5/2005 | Lim et al. |
| 6,930,737 | B2 | 8/2005 | Weindorf et al. |
| 7,001,059 | B2 | 2/2006 | Han et al. |
| 7,176,438 | B2 | 2/2007 | Bamji et al. |
| 7,255,462 | B2 | 8/2007 | Tseng |
| 7,315,288 | B2 | 1/2008 | Livingston et al. |
| 7,348,949 | B2 | 3/2008 | Lee et al |
| 2001/0035853 | A1 | 11/2001 | Hoelen et al. |
| 2004/0135522 | A1 | 7/2004 | Berman et al. |
| 2005/0212459 | A1 | 9/2005 | Patel et al. |
| 2005/0231127 | A1 | 10/2005 | Yamamoto et al. |
| 2005/0231459 | A1 | 10/2005 | Furukawa |
| 2006/0038769 | A1 | 2/2006 | Marra et al. |
| 2006/0050529 | A1 | 3/2006 | Chou et al. |
| 2006/0108933 | A1 | 5/2006 | Chen |
| 2006/0132423 | A1 | 6/2006 | Travis |
| 2006/0187181 | A1 | 8/2006 | Kim |
| 2006/0221047 | A1 | 10/2006 | Tanizoe et al. |
| 2006/0244508 | A1 | 11/2006 | Zheng et al. |
| 2007/0046485 | A1 | 3/2007 | Grootes et al. |
| 2007/0063961 | A1 | 3/2007 | Kuroki |
| 2007/0115228 | A1 | 5/2007 | Roberts et al. |
| 2007/0182701 | A1 | 8/2007 | Kim et al. |
| 2008/0018267 | A1 | 1/2008 | Arakawa et al. |

FOREIGN PATENT DOCUMENTS

| | | | |
|---|---|---|---|
| WO | 2005111976 | A1 | 11/2005 |
| WO | 2006005033 | A2 | 1/2006 |
| WO | 2006070323 | A1 | 7/2006 |
| WO | PCT/IL2008/000787 | | 9/2008 |

OTHER PUBLICATIONS

Perduijn et al; "Light Output Feedback Solution for RGB LED Backlight Application"; SID 03 Digest; 2003; pp. 1254-1256; The Society for Information Display, San Jose, California.

Chen et al; "LED Back-Light Driving System for LCD Panels"; Applied Power Electronics Conference and Exposition; Published Mar. 19-23, 2006; IEEE New York.

Li, Perry Y. and Dianat, Sohail A.; "Robust Stabilization of Tone Reproduction Curves for the Xerographic Printing Process"; IEEE Transaction on Control Systems Technology, vol. 9, No. 2, Mar. 2001; pp. 407-415; published IEEE, New York.

Li, Perry Y. and Dianat, Sohail A., "Robust Stabilization of Tone Reproduction Curves for the Xerographic Printing Process"; 1998 IEEE Conference on Control Applications; Sep., Trieste, 1998; published IEEE, New York.

BRIGHTNESS CONTROL FOR DYNAMIC SCANNING BACKLIGHT

CROSS-REFERENCE TO RELATED APPLICATIONS

This application claims priority to U.S. Provisional Patent Application Ser. No. 60/946,147 filed Jun. 26, 2007 entitled “Brightness Control for Dynamic Scanning Backlight” and U.S. Provisional Patent Application Ser. No. 60/954,338 filed Aug. 7, 2008 entitled “Optical Sampling and Control Element”, the contents of both of which are incorporated herein by reference. This application is further related to co-filed U.S. Patent Application entitled “Optical Sampling and Control Element”, the entire contents of which is incorporated herein by reference.

BACKGROUND OF THE INVENTION

The present invention relates to the field of light emitting diode based lighting and more particularly to a method of improved color and brightness control for LED backlighting.

Light emitting diodes (LEDs) and in particular high intensity and medium intensity LED strings are rapidly coming into wide use for lighting applications. LEDs with an overall high luminance are useful in a number of applications including backlighting for liquid crystal display (LCD) based monitors and televisions, collectively hereinafter referred to as a matrix display. In a large LCD matrix display typically the LEDs are supplied in one or more strings of serially connected LEDs, thus sharing a common current. Matrix displays typically display the image as a series of frames, with the information for the display being drawn from left to right in a series of descending lines during the frame.

In order supply a white backlight for the matrix display one of two basic techniques are commonly used. In a first technique one or more strings of “white” LEDs are utilized, the white LEDs typically comprising a blue LED with a phosphor which absorbs the blue light emitted by the LED and emits a white light. In a second technique one or more individual strings of colored LEDs are placed in proximity so that in combination their light is seen a white light. Often, two strings of green LEDs are utilized to balance one string each of red and blue LEDs.

In either of the two techniques, the strings of LEDs are in one embodiment located at one end or one side of the matrix display, the light being diffused to appear behind the LCD by a diffuser. In another embodiment the LEDs are located directly behind the LCD, the light being diffused so as to avoid hot spots by a diffuser. In the case of colored LEDs, a further mixer is required, which may be part of the diffuser, to ensure that the light of the colored LEDs is not viewed separately, but rather mixed to give a white light. The white point of the light is an important factor to control, and much effort in design in manufacturing is centered on the need to maintain a correct white point.

Each of the colored LED strings is typically intensity controlled by both amplitude modulation (AM) and pulse width modulation (PWM) to achieve an overall fixed perceived luminance. AM is typically used to set the white point produced by the disparate colored LED strings by setting the constant current flow through the LED string to a value achieved as part of a white point calibration process and PWM is typically used to variably control the overall luminance, or brightness, of the monitor without affecting the white point balance. Thus the current, when pulsed on, is held constant to maintain the white point among the disparate colored LED strings, and the PWM duty cycle is controlled to dim or brighten the backlight by adjusting the average current. The PWM duty cycle of each color is further modified to maintain the white point, preferably responsive to a color sensor, such as an RGB color sensor. The color sensor is arranged to receive the mixed white light, and thus a color control feedback loop may be maintained. It is to be noted that different colored LEDs age, or reduce their luminance as a function of current, at different rates and thus the PWM duty cycle of each color must be modified over time to maintain the white point set by AM. The colored LEDs also change their output as a function of temperature, which must be further corrected for by adjusting the respective PWM duty cycles to achieve the desired white point.

One known problem of LCD matrix displays is motion blur. One cause of motion blur is that the response time of the LCD is finite. Thus, there is a delay from the time of writing to the LCD pixel until the image changes. Furthermore, since each pixel is written once per scan, and is then held until the next scan, smooth motion is not possible. The eye notices the image being in the wrong place until the next sample, and interprets this as blur or smear.

This problem is addressed by a scanning backlight, in which the matrix display is divided into a plurality of regions, or zones, and the backlight for each zone is illuminated for a short period of time in synchronization with the writing of the image. Ideally, the backlighting for the zone is illuminated just after the pixel response time, and the illumination is held for a predetermined illumination frame time whose timing is associated with the particular zone.

An additional known problem of LCD matrix displays is the lack of contrast, and in particular in the presence of ambient light. An LCD matrix display operates by providing two linear polarizers whose orientation in relation to each other is adjustable. If the linear polarizers are oriented orthogonally to each other, light from the backlight is prevented from being transmitted in the direction of the viewer. If the linear polarizers are aligned, the maximum amount of light is transmitted in the direction of the viewer. Unfortunately, a certain amount of light leakage occurs when the polarizers are oriented orthogonally to each other, thus reducing the overall contrast.

This problem is addressed by adding dynamic capability to the scanning backlight, the dynamic capability adjusting the overall luminance of the backlight for each zone responsive to the current video signal, typically calculated by a video processor. Thus, in the event of a dark scene, the backlight luminance is reduced thereby improving the contrast. Since the luminance of a scene may change on a frame by frame basis, the luminance is preferably set on a frame by frame basis, responsive to the video processor. It is to be noted that a new frame begins every 16.7-20 milliseconds, depending on the system used.

An article by Perduijn et al, entitled “Light Output Feedback Solution for RGB LED Backlight Applications, published as part of the SID 03 Digest, by the Society for Information Display, San Jose, Calif., ISSN/0003-0996X/)3/3403-1254, the entire contents of which is incorporated herein by reference, is addressed to a backlighting system utilizing RGB LED light sources, a color sensor and feedback controller operative to maintain a color stability over temperature, denoted $\Delta u'v'$ of less than 0.002. Optionally brightness can be maintained constant. Brightness, or luminance, control is accomplished by comparing the luminance sensed output of the LEDs with a luminance set point. The difference, is fed to adjust the color set points, and the loop is closed via the color control loop. Unfortunately, in the instance of a dynamic backlight as described above, use of the color control loop to control luminance requires a high speed color loop, because the luminance may change from frame to frame. Such a high speed color loop adds to cost.

U.S. Patent Application Publication S/N 2006/0221047 A1 in the name of Tanizoe et al, published Oct. 5, 2006 and entitled "Liquid Crystal Display Device", the entire contents of which is incorporated herein by reference, is addressed to a liquid crystal display device capable of shortening the time required for stabilizing the brightness and chromaticity to the temperature change. A brightness setting means is multiplied with a color setting means prior to feedback to a comparison means, and thus a single feedback loop controls both brightness and color. Unfortunately, in the instance of dynamic backlight, use of the color control loop to control luminance requires a high speed color loop, because the luminance may change from frame to frame, thus adding to cost.

What is needed, and not provided by the prior art, is a means for operating a feedback color loop of a PWM controlled light source whose target value luminance may be changed on a frame to frame basis.

SUMMARY

Accordingly, it is a principal object of the present invention to overcome at least some of the disadvantages of prior art. This is provided in certain embodiments by arranging a modulation signal generator driving constituent LEDs of a backlight luminaire to be directly responsive to a luminance setting input, which is variable on an individual frame basis. Thus, the overall luminance of the LEDs is immediately responsive to the luminance setting output of a video processor. A slow acting color loop is unaffected by the changing luminance from frame to frame by scaling one of the reference target values and the sampled optical output.

In another embodiment, the luminance setting per frame is segregated from the target color value, and the modulation signal generator driving the constituent LEDs of the backlight luminaire is arranged to be directly responsive to luminance setting input, which is variable on an individual frame basis. The slow acting color loop is unaffected by the changing luminance from frame to frame. In one further embodiment the luminance value is not operated in a closed loop fashion.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

Figure 1:
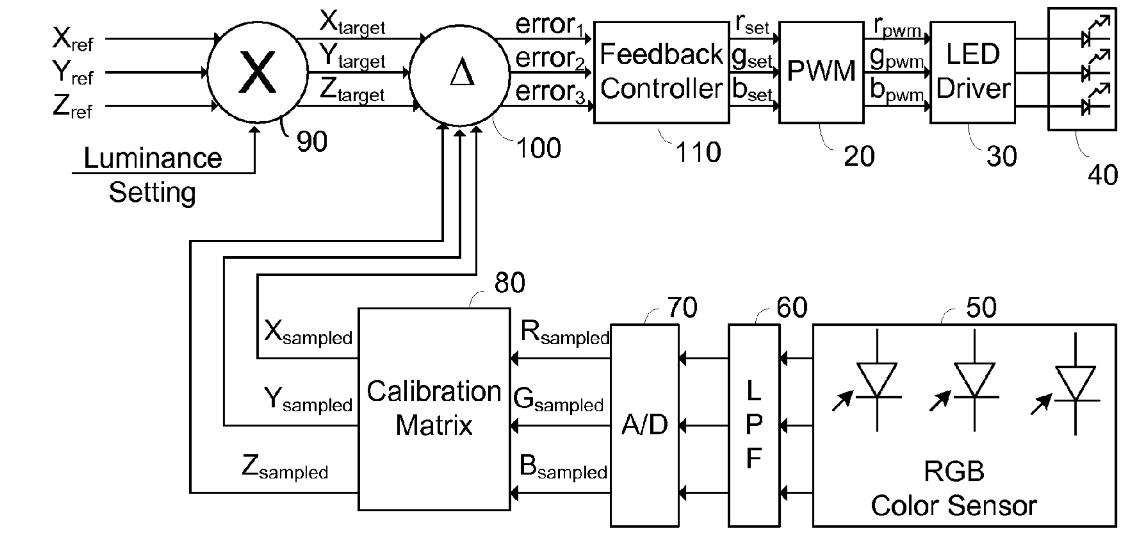
Fig. 1 Prior Art
FIG. 1 illustrates a high level block diagram of a color control loop for LED backlighting in accordance with the prior art.

The present embodiments enable, in one embodiment, a modulation signal generator driving constituent LEDs of a backlight luminaire to be directly responsive to a luminance setting input, which is variable on an individual frame basis. Thus, the overall luminance of the LEDs is immediately responsive to the luminance setting output of a video processor. A slow acting color loop is unaffected by the changing luminance from frame to frame by scaling one of the reference target values and the sampled optical output.

In another embodiment, the luminance setting per frame is segregated from the target color value, and the modulation signal generator driving the constituent LEDs of the backlight luminaire is arranged to be directly responsive to luminance setting input, which is variable on an individual frame basis. The slow acting color loop is unaffected by the changing luminance from frame to frame. In one further embodiment the luminance value is not operated in a closed loop fashion.

The luminance setting per frame may be presented by a dimming signal or a boosting signal without exceeding the scope of the invention. The luminance setting per frame may presented as an analog or a digital signal without exceeding the scope of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level block diagram of a color control loop for LED backlighting in accordance with the prior art comprising: a PWM generator 20; an LED driver 30; a plurality of LED strings 40 comprising red, blue and green LED strings; an RGB color sensor 50; a low pass filter 60; an analog to digital (A/D) converter 70; a calibration matrix 80; a scaler 90; a difference generator 100; and a feedback controller 110.

PWM generator 20 is arranged to output a PWM red LED signal denoted $r_{pwm}$, a PWM green LED signal denoted $g_{pwm}$, and a PWM blue LED signal denoted $b_{pwm}$. LED driver 30 is arranged to receive $r_{pwm}$, $g_{pwm}$ and $b_{pwm}$ and drive the respective red, blue and green plurality of LED strings 40 responsive to the respective received $r_{pwm}$, $g_{pwm}$ and $b_{pwm}$ signal. RGB color sensor 50 is in optical communication with the output of the plurality of LED strings 40 and is operative to output a plurality of signals responsive to the output LED strings 40. Low pass filter 60 is arranged to receive the output of RGB color sensor 50 and reduce any noise thereof by only passing low frequency signals. A/D converter 70 is arranged to receive the output of low pass filter 60 and output a plurality of sampled and digitized signals thereof denoted respectively, $R_{sampled}$, $G_{sampled}$ and $B_{sampled}$. Calibration matrix 80 is arranged to receive $R_{sampled}$, $G_{sampled}$ and $B_{sampled}$ and output a plurality of calibration converted sampled signals denoted respectively $X_{sampled}$, $Y_{sampled}$ and $Z_{sampled}$. Calibration matrix 80 converts $R_{sampled}$, $G_{sampled}$ and $B_{sampled}$ to a colorimetric system consonant with calorimetric system of the received color target reference signals described further below. The above has been described in relation to the CIE 1931 color space, however this is not meant to be limiting in any way. Use of other color spaces, including but not limited to the CIE LUV color space, and the CIE LAB color space are specifically incorporated herewith.

Scaler 90, illustrated as a multiplier, is arranged to receive a luminance setting input, which in one embodiment comprises a dimming signal or a boosting signal, and a plurality of color target reference signals denoted respectively $X_{ref}$, $Y_{ref}$, $Z_{ref}$, and output a plurality of luminance scaled color target reference signals denoted respectively $X_{target}$, $Y_{target}$ and $Z_{target}$. The luminance scaled color target reference signals $X_{target}$, $Y_{target}$ and $Z_{target}$ represent $X_{ref}$, $Y_{ref}$, $Z_{ref}$ multiplied by the dimming factor of the luminance setting input signal. Alternatively, in the event a boosting signal is received, the luminance scaled color target reference signals $X_{target}$, $Y_{target}$ and $Z_{target}$ represent $X_{ref}$, $Y_{ref}$, $Z_{ref}$ scaled by the boosting value of the luminance setting input signal. Difference generator 100 is arranged to receive the sets of $X_{target}$, $Y_{target}$ and $Z_{target}$ and $X_{sampled}$, $Y_{sampled}$ and $Z_{sampled}$ and output a plurality of error signals denoted respectively $error_1$, $error_2$ and $error_3$ reflective of any difference thereof. Feedback controller 110 is arranged to receive $error_1$, $error_2$ and $error_3$ and output a plurality of PWM control signals denoted respectively $r_{set}$, $g_{set}$ and $b_{set}$ which are operative to control the duty cycle of the respective PWM signals of PWM generator 20. PWM generator 20 is arranged to receive $r_{set}$, $g_{set}$ and $b_{set}$ and as described above output $r_{pwm}$, $g_{pwm}$ and $b_{pwm}$ responsive thereto. LED strings 40 may be replaced with individual red, green and blue LEDs, or modules comprising individual red, green and blue LEDs, without exceeding the scope of the invention.

In operation, a host system, or a non-volatile memory set at an initial calibration, outputs $X_{ref}$, $Y_{ref}$ and $Z_{ref}$, thereby setting the desired white point, or other correlated color temperature, of LED strings 40. A luminance setting signal, preferably responsive to a user input, is operative to set the desired overall luminance by adjusting $X_{ref}$, $Y_{ref}$ and $Z_{ref}$ by a dimming or boosting factor through scaler 90, thereby generating scaled color target reference signals $X_{target}$, $Y_{target}$ and $Z_{target}$. Feedback controller 110 is operative in cooperation with PWM generator 20, RGB color sensor 50 and calibration matrix 80 to close the color loop thereby maintaining the light output by LED strings 40 consonant with scaled color target reference signals $X_{target}$, $Y_{target}$ and $Z_{target}$. Feedback controller 110 is typically implemented as a proportional integral derivative (PID) controller requiring a plurality of steps to settle at the revised value. Thus any change to the luminance setting input, which affects the luminance by way of the color loop, requires multiple passes to fully stabilize. In the event of rapid changes in the luminance setting input, and in particular in the event of a dynamic backlight as described above, consistent adjustment of the overall luminance responsive to the luminance setting input is not achieved on a per frame basis, unless an extremely high speed color loop is implemented, thereby adding to cost.

Figure 2:
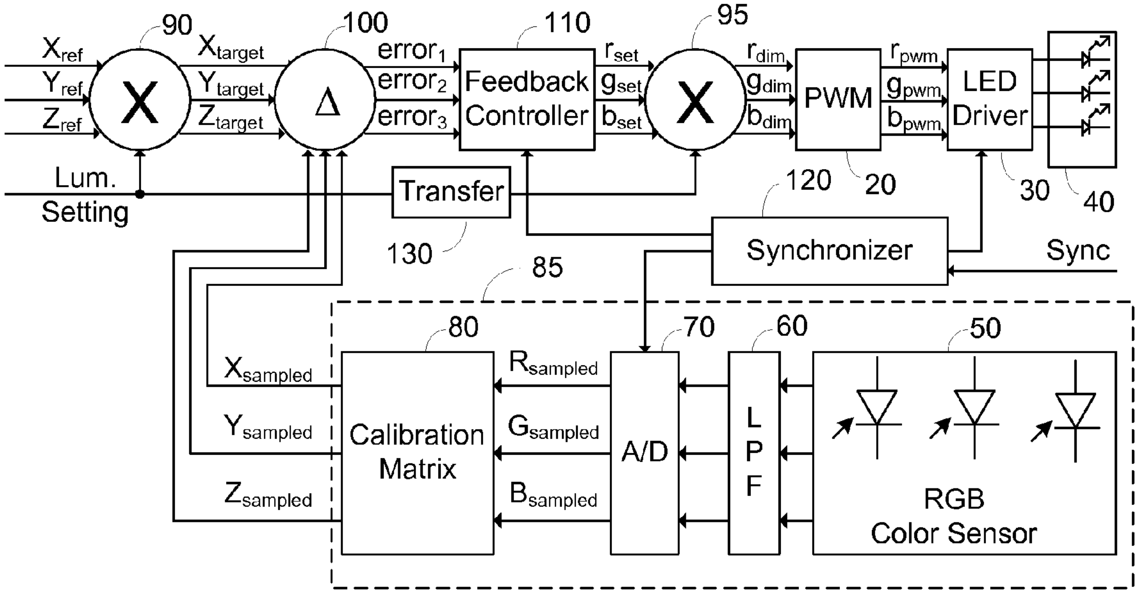
FIG. 2 illustrates a high level block diagram of a first embodiment of a color control loop for LED backlighting exhibiting a direct luminance setting input in accordance with a principle of the current invention, in which the received reference values are scaled by the luminance setting input.

FIG. 2 illustrates a high level block diagram of a first embodiment of a color control loop for LED backlighting exhibiting a direct luminance setting input, in accordance with a principle of the current invention, in which the received reference values are scaled by the luminance setting input, the color control loop comprising: a PWM generator 20; an LED driver 30; a plurality of LED strings 40 comprising red, blue and green LED strings; an optical sampler 85 comprising an RGB color sensor 50, a low pass filter 60, an A/D converter 70 and a calibration matrix 80; a first scaler 90; a second scaler 95; a difference generator 100; a feedback controller 110; a synchronizer 120; and a transfer function converter 130.

PWM generator 20 is arranged to output a PWM red LED signal denoted $r_{pwm}$, a PWM green LED signal denoted $g_{pwm}$, and a PWM blue LED signal denoted $b_{pwm}$. LED driver 30 is arranged to receive $r_{pwm}$, $g_{pwm}$ and $b_{pwm}$ and drive the respective red, blue and green plurality of LED strings 40 responsive to the respective received $r_{pwm}$, $g_{pwm}$ and $b_{pwm}$. RGB color sensor 50 is in optical communication with the output of the plurality of LED strings 40 and is operative to output a plurality of signals responsive to the optical output of LED strings 40. Low pass filter 60 is arranged to received the output of RGB color sensor 50 and reduce any noise thereof by only passing low frequency signals. A/D converter 70 is arranged to receive the output of low pass filter 60 and output a plurality of sampled and digitized signals thereof denoted respectively, $R_{sampled}$, $G_{sampled}$ and $B_{sampled}$, the sampling and digitizing being responsive to synchronizer 120. Calibration matrix 80 is arranged to receive $R_{sampled}$, $G_{sampled}$ and $B_{sampled}$ and output a plurality of calibration converted sampled signals denoted respectively $X_{sampled}$, $Y_{sampled}$ and $Z_{sampled}$. Calibration matrix 80 converts $R_{sampled}$, $G_{sampled}$ and $B_{sampled}$ to a calorimetric system consonant with calorimetric system of the received color target reference signals described further below. The above has been described in relation to the CIE 1931 color space, however this is not meant to be limiting in any way. Use of other color spaces, including but not limited to the CIE LUV color space, and the CIE LAB color space are specifically incorporated herewith. Thus, optical sampler 85 is in optical communication with LED strings 40 and outputs a signal representative thereof consonant with received target reference signals.

First scaler 90, illustrated as a multiplier, is arranged to receive a luminance setting input, which in one embodiment comprises a dimming signal or a boosting signal, and a plurality of color target reference signals denoted respectively $X_{ref}$, $Y_{ref}$, $Z_{ref}$, and output a plurality of luminance scaled color target reference signals denoted respectively $X_{target}$, $Y_{target}$ and $Z_{target}$. The luminance scaled color target reference signals $X_{target}$, $Y_{target}$ and $Z_{target}$ represent $X_{ref}$, $Y_{ref}$, $Z_{ref}$ multiplied by the value of the luminance setting input signal. Alternatively, in the event a boosting signal is received, the luminance scaled color target reference signals $X_{target}$, $Y_{target}$ and $Z_{target}$ represent $X_{ref}$, $Y_{ref}$, $Z_{ref}$ scaled by the boosting value of the luminance setting input signal.

Difference generator 100 is arranged to receive the sets of $X_{target}$, $Y_{target}$ and $Z_{target}$ and $X_{sampled}$, $Y_{sampled}$ and $Z_{sampled}$ and output a plurality of error signals denoted respectively $error_1$, $error_2$ and $error_3$ reflective of any difference thereof. Feedback controller 110 is arranged to receive $error_1$, $error_2$ and $error_3$ and output a plurality of PWM control signals denoted respectively $r_{set}$, $g_{set}$ and $b_{set}$ to control the duty cycle of the respective PWM signals of PWM generator 20. Second scaler 95, illustrated as a multiplier, receives the luminance setting input signal via transfer function converter 130, and $r_{set}$, $g_{set}$ and $b_{set}$ and outputs a scaled set of PWM control signals, the scaling reflecting the value of the luminance setting signal, denoted respectively, $r_{dim}$, $g_{dim}$, $b_{dim}$. PWM generator 20 is arranged to receive the scaled set of PWM control signals, $r_{dim}$, $g_{dim}$, $b_{dim}$ and output $r_{pwm}$, $g_{pwm}$ and $b_{pwm}$ responsive thereto, exhibiting the appropriate luminance setting. LED strings 40 may be replaced with individual red, green and blue LEDs, or modules comprising individual red, green and blue LEDs, without exceeding the scope of the invention.

Each of feedback controller 110, LED driver 30 and, as indicated above, A/D converter 70 receives a respective output of synchronizer 120. Feedback controller 110 is typically implemented as a PID controller requiring a plurality of steps to settle at the revised value. Synchronizer 120 is operative to: enable LED driver 30, responsive to a received Sync signal, during the appropriate portion of the frame; allow for propagation of the output of LED driver 30 through LED strings 40, RGB color sensor 50 and LPF 60 prior to sampling the output of LPF 60 by A/D converter 70; allow for settling of the output of A/D converter 70 with the sampled output of LPF 60, propagation through calibration matrix 80 and propagation through difference generator 100; and step feedback controller 110 with resultant sampled output of LED strings 40. Thus, synchronizer 120 controls A/D converter 70 and feedback controller 110 to ensure that the change in luminance of LED strings 40 responsive to the received luminance setting input at second scaler 95 impacts the input of feedback controller 110 prior to stepping feedback controller 110.

Transfer function converter 130 is operative to compensate for any non-linearity in the response of LED strings 40 to a change in PWM setting. Thus, in the event of a purely linear response of luminance to a dimming or boosting factor, transfer function converter 130 acts as a pass through. In the event of any non-linearity, transfer function converter 130 acts to provide the PWM to luminance transfer function, which in one embodiment is stored in a look up table, and in another embodiment is implemented as a direct transfer function.

In operation, a host system, or a non-volatile memory, set at an initial calibration, outputs $X_{ref}$, $Y_{ref}$ and $Z_{ref}$, thereby setting the desired white point, or other correlated color temperature, and base luminance, of LED strings 40. A luminance setting signal, preferably responsive to a video processor on a frame by frame basis, is operative to set the overall luminance on a frame by frame basis without affecting the desired white point or other correlated color temperature setting by directly inputting the luminance setting input through second scaler 95, thereby generating scaled PWM control signals $r_{dim}$, $g_{dim}$, $b_{dim}$. The luminance setting input signal may be further responsive to a user input, preferably as an input to the video processor, or scaling the output of the video processor without exceeding the scope of the invention. It is to be noted that the effect of the luminance setting signal is thus immediate, and is irrespective of the action of the slow acting color loop. The color loop is made impervious to the luminance setting signal value by further inputting the luminance setting signal to first scaler 90, thereby scaling color target reference signals $X_{ref}$, $Y_{ref}$ and $Z_{ref}$ to generate $X_{target}$, $Y_{target}$ and $Z_{target}$ consonant with the sampled values $X_{sampled}$, $Y_{sampled}$ and $Z_{sampled}$. Difference generator 100 compares $X_{target}$, $Y_{target}$ and $Z_{target}$ respectively with $X_{sampled}$, $Y_{sampled}$ and $Z_{sampled}$, and outputs error signals $error_1$, $error_2$ and $error_3$, reflective of the respective difference thereof. Feedback controller 110 is operative in cooperation with PWM generator 20 via second scaler 95, RGB color sensor 50 and calibration matrix 80 to close the color loop thereby maintaining the light output by LED strings 40 consonant with color target reference signals $X_{ref}$, $Y_{ref}$ and $Z_{ref}$. Synchronizer 120 acts to enable LED driver 30 during the appropriate portion of the frame, clock A/D converter 70 so as to sample the optical output during the active portion of the frame, and step feedback controller 110 responsive to the clocked sample optical output. In one embodiment, A/D converter 70 samples the optical output each PWM cycle of PWM controller 20 when LED driver 30 is enabled, responsive to synchronizer 120. Preferably, in such an embodiment LPF 60 is replaced with an integrator arranged to present the overall energy of the PWM cycle to A/D converter 70.

It is to be understood that either or both of, first scaler 90 and second scaler 95 may be implemented digitally, or in an analog fashion, and any analog to digital conversion required is specifically incorporated herein.

Thus, the arrangement of FIG. 2 enables immediate luminance setting responsive to the luminance setting input signal, input via second scaler 95, without affecting the slow acting color loop. The slow acting color loop is held invariant in face of the changing luminance due to the scaling action of first scaler 90.

The above embodiment has been explained in reference to an embodiment in which LEDs 40 are driven by a PWM signal, whose duty cycle is controlled so as to accomplish both dimming or boosting and control of the color correlated temperature, however this is not meant to be limiting in any way. In another embodiment LEDs 40 are adjusted by one or more of a resonance controller and amplitude modulation to control at least one of dimming or boosting and the color correlated temperature without exceeding the scope of the invention.

Figure 3:
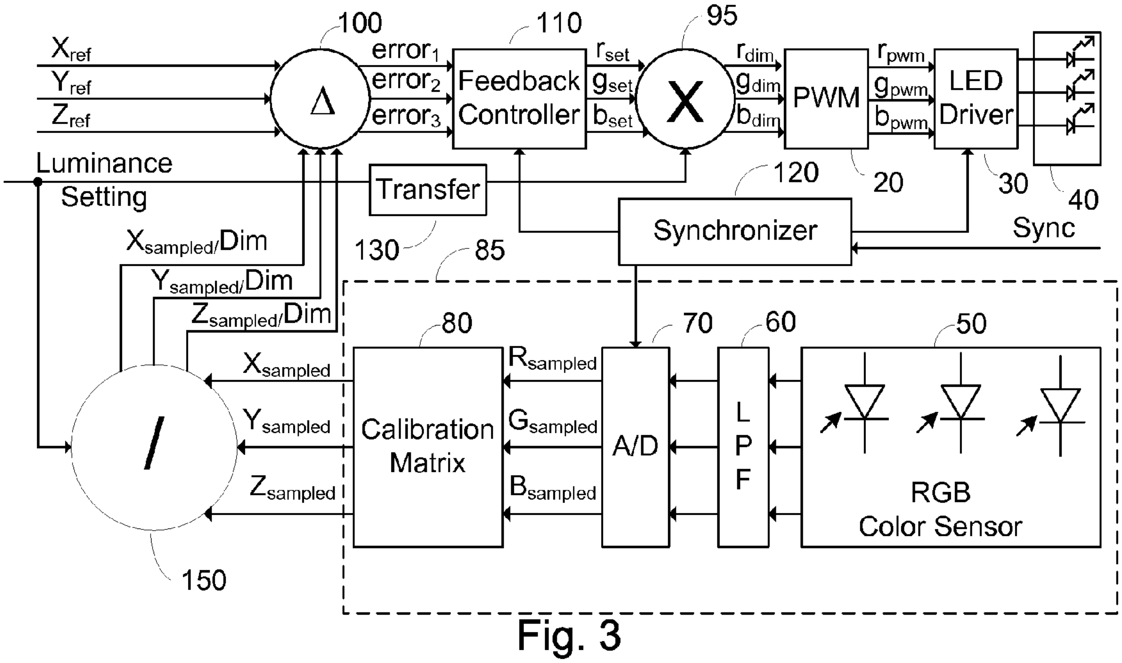
FIG. 3 illustrates a high level block diagram of a second embodiment of a color control loop for LED backlighting exhibiting a direct luminance setting input in accordance with a principle of the current invention, in which the sampled optical output is scaled by the luminance setting input.

FIG. 3 illustrates a high level block diagram of a second embodiment of a color control loop for LED backlighting exhibiting a direct luminance setting input, in accordance with a principle of the current invention, in which the sampled optical output is scaled by the luminance setting input, the color control loop comprising: a PWM generator 20; an LED driver 30; a plurality of LED strings 40 comprising red, blue and green LED strings; an optical sampler 85 comprising an RGB color sensor 50, a low pass filter 60, an A/D converter 70 and a calibration matrix 80; a first scaler 150; a second scaler 95; a difference generator 100; a feedback controller 110; and a synchronizer 120.

PWM generator 20 is arranged to output a PWM red LED signal denoted $r_{pwm}$, a PWM green LED signal denoted $g_{pwm}$, and a PWM blue LED signal denoted $b_{pwm}$. LED driver 30 is arranged to receive $r_{pwm}$, $g_{pwm}$ and $b_{pwm}$ and drive the respective red, blue and green plurality of LED strings 40 responsive to the respective received $r_{pwm}$, $g_{pwm}$ and $b_{pwm}$. RGB color sensor 50 is in optical communication with the output of the plurality of LED strings 40 and is operative to output a plurality of signals responsive to the optical output of LED strings 40. Low pass filter 60 is arranged to received the output of RGB color sensor 50 and reduce any noise thereof by only passing low frequency signals. A/D converter 70 is arranged to receive the output of low pass filter 60 and output a plurality of sampled and digitized signals thereof denoted respectively, $R_{sampled}$, $G_{sampled}$ and $B_{sampled}$, the sampling and digitizing being responsive to synchronizer 120. Calibration matrix 80 is arranged to receive $R_{sampled}$, $G_{sampled}$ and $B_{sampled}$ and output a plurality of calibration converted sampled signals denoted respectively $X_{sampled}$, $Y_{sampled}$ and $Z_{sampled}$. Calibration matrix 80 converts $R_{sampled}$, $G_{sampled}$ and $B_{sampled}$ to a calorimetric system consonant with calorimetric system of the received color target reference signals described further below. The above has been described in relation to the CIE 1931 color space, however this is not meant to be limiting in any way. Use of other color spaces, including but not limited to the CIE LUV color space, and the CIE LAB color space are specifically incorporated herewith. Thus, optical sampler 85 is in optical communication with LED strings 40 and outputs a signal representative thereof consonant with received target reference signals.

First scaler 150, illustrated as a divider, is arranged to receive a luminance setting input signal, expressed for simplicity as a percentage of full luminance, and the plurality of calibration converted sampled signals denoted respectively $X_{sampled}$, $Y_{sampled}$ and $Z_{sampled}$ and output a plurality of scaled calibrated converted sampled signals, denoted respectively $X_{sampled}$/Dim, $Y_{sampled}$/Dim and $Z_{sampled}$/Dim. Thus, the output of first scaler 150 represents the sampled light received by RGB sensor 50, sampled and calibrated by A/D converter 70 and calibration matrix 80, respectively, scaled up by the inverse of the dimming factor to be consonant with the input reference levels $X_{ref}$, $Y_{ref}$ and $Z_{ref}$, respectively. The above has been described in an embodiment in which the luminance setting input is received as a dimming signal, however this is not meant to be limiting in any way. In another embodiment the luminance setting input is received as a boost signal without exceeding the scope of the invention, and first scaler 150 acts as a multiplier. The luminance setting input may be received as an analog signal or a digital signal without exceeding the scope of the invention.

Difference generator 100 is arranged to receive a plurality of color target reference signals denoted respectively $X_{ref}$, $Y_{ref}$, $Z_{ref}$ and the set of $X_{sampled}$/Dim, $Y_{sampled}$/Dim and $Z_{sampled}$/Dim and output a plurality of error signals denoted respectively $error_1$, $error_2$ and $error_3$ reflective of any difference thereof. Feedback controller 110 is arranged to receive $error_1$, $error_2$ and $error_3$ and output a plurality of PWM control signals denoted respectively $r_{set}$, $g_{set}$ and $b_{set}$ to control the duty cycle of the respective PWM signals of PWM generator 20. Second scaler 95, illustrated as a multiplier; receives the luminance setting input signal, and $r_{set}$, $g_{set}$ and $b_{set}$ and outputs a scaled set of PWM control signals, the scaling reflecting the value of the luminance setting signal, denoted respectively, $r_{dim}$, $g_{dim}$, $b_{dim}$. PWM generator 20 is arranged to receive the scaled set of PWM control signals, $r_{dim}$, $g_{dim}$, $b_{dim}$ and output $r_{pwm}$, $g_{pwm}$ and $b_{pwm}$ responsive thereto, exhibiting the appropriate color and luminance level. LED strings 40 may be replaced with red, green and blue LEDs without exceeding the scope of the invention.

Each of feedback controller 110, LED driver 30 and, as indicated above, A/D converter 70 receives a respective output of synchronizer 120. Feedback controller 110 is typically implemented as a PID controller requiring a plurality of steps to settle at the revised value. Synchronizer 120 is operative to: enable LED driver 30, responsive to a received Sync signal, during the appropriate portion of the frame; allow for propagation of the output of LED driver 30 through LED strings 40, RGB color sensor 50 and LPF 60 prior to sampling the output of LPF 60 by A/D converter 70; allow for settling of the output of A/D converter 70 with the sampled output of LPF 60, propagation through calibration matrix 80 and propagation through first scaler 150 and difference generator 100; and step feedback controller 110 with resultant sampled output of LED strings 40. Thus, synchronizer 120 controls A/D converter 70 and feedback controller 110 to ensure that the change in luminance of LED strings 40 responsive to the received luminance setting input at second scaler 95 impacts the input of feedback controller 110 prior to stepping feedback controller 110.

Transfer function converter 130 is operative to compensate for any non-linearity in the response of LED strings 40 to a change in PWM setting. Thus, in the event of a purely linear response of luminance to a dimming or boosting factor, transfer function converter 130 acts as a pass through. In the event of any non-linearity, transfer function converter 130 acts to provide the PWM to luminance transfer function, which in one embodiment is stored in a look up table, and in another embodiment is implemented as a direct transfer function.

In operation, a host system, or a non-volatile memory, set at an initial calibration, outputs $X_{ref}$, $Y_{ref}$ and $Z_{ref}$, thereby setting the desired white point, or other correlated color temperature, and base luminance of LED strings 40. A luminance setting input signal, preferably responsive to a video processor on a frame by frame basis, is operative to set the overall luminance on a frame by frame basis without affecting the desired white point or other correlated color temperature setting by directly inputting the luminance setting input through second scaler 95, thereby generating scaled PWM control signals $r_{dim}$, $g_{dim}$, $b_{dim}$. The luminance setting input signal may be further responsive to a user input, preferably as an input to the video processor, or scaling the output of the video processor without exceeding the scope of the invention. It is to be noted that the effect of the luminance setting signal is thus immediate, and is irrespective of the action of the slow acting color loop. The color loop is made impervious to the luminance setting signal value by further inputting the luminance setting signal to first scaler 150, thereby scaling calibrated converted sampled signals $X_{sampled}$, $Y_{sampled}$ and $Z_{sampled}$ to $X_{sampled}$/Dim, $Y_{sampled}$/Dim and $Z_{sampled}$/Dim consonant with the received $X_{ref}$, $Y_{ref}$ and $Z_{ref}$, respectively. Difference generator 100 compares $X_{ref}$, $Y_{ref}$ and $Z_{ref}$ respectively with $X_{sampled}$/Dim, $Y_{sampled}$/Dim and $Z_{sampled}$/Dim, and outputs error signals $error_1$, $error_2$ and $error_3$, reflective of the respective difference thereof. Feedback controller 110 is operative in cooperation with PWM generator 20 via second scaler 95, RGB color sensor 50 and calibration matrix 80 to close the color loop thereby maintaining the light output by LED strings 40 consonant with color target reference signals $X_{ref}$, $Y_{ref}$ and $Z_{ref}$. Synchronizer 120 acts to enable LED driver 30 during the appropriate portion of the frame, clock A/D converter 70 so as to sample the optical output during the active portion of the frame, and step feedback controller 110 responsive to the clocked sample optical output. In one embodiment, A/D converter 70 samples the optical output each PWM cycle of PWM controller 20 when LED driver 30 is enabled, responsive to synchronizer 120. Preferably, in such an embodiment LPF 60 is replaced with an integrator arranged to present the overall energy of the PWM cycle to A/D converter 70.

It is to be understood that either or both of, first scaler 150 and second scaler 95 may be implemented digitally, or in an analog fashion, and any analog to digital conversion required is specifically incorporated herein.

Thus, the arrangement of FIG. 3 enables immediate luminance setting responsive to the luminance setting input signal, input via second scaler 95, without affecting the slow acting color loop. The slow acting color loop is held invariant in face of the changing luminance due to the scaling action of first scaler 150.

The above embodiment has been explained in reference to an embodiment in which LEDs 40 are driven by a PWM signal, whose duty cycle is controlled so as to accomplish both dimming or boosting and control of the color correlated temperature, however this is not meant to be limiting in any way. In another embodiment LEDs 40 are adjusted by one or more of a resonance controller and amplitude modulation to control at least one of dimming or boosting and the color correlated temperature without exceeding the scope of the invention.

Figure 4:
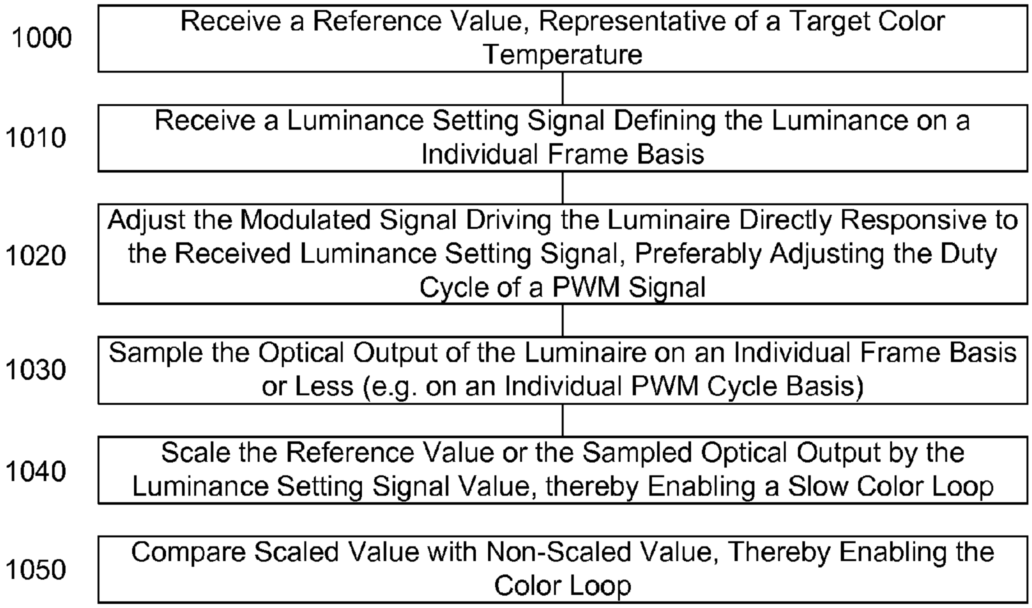
FIG. 4 illustrates a high level flow chart of a method according to a principle of the invention to enable color control by a slow color loop and per frame luminance control in cooperation with the embodiments of FIG. 2 or FIG. 3.

FIG. 4 illustrates a high level flow chart of a method according to a principle of the invention to enable color control by a slow color loop and per frame luminance control in cooperation with the embodiment of FIG. 2 or FIG. 3. In stage 1000, a reference value is received, the received reference value being representative of a target color correlated temperature and base luminance. In one embodiment the received reference value represents a white point.

In stage 1010, a luminance setting input signal is received, the received luminance setting signal defining the desired luminance of the backlight, or a particular zone of the backlight, on an individual frame basis. The luminance setting signal may be a dimming signal or a boosting signal without exceeding the scope of the invention. Thus, the reference value of stage 1000 is invariant between frames, while the luminance setting signal of stage 1010 is variable on a frame by frame basis. There is no requirement that the luminance setting signal be varied for each frame, and a plurality of contiguous frames exhibiting an unchanged luminance setting may be exhibited without exceeding the scope of the invention. There is no requirement that that reference values of stage 1000 be permanently fixed, and changes to the reference values of stage 1000 may occur, albeit preferably not on a frame by frame basis, without exceeding the scope of the invention.

In stage 1020, the modulated signal driving a luminaire is adjusted directly responsive to the received luminance setting signal of stage 1010. The term directly responsive as used herein, is meant to indicate that the luminance of the luminaire is adjusted responsive to the changed luminance setting signal as opposed to luminance change occurring primarily through action of the slow color loop as described in relation to FIG. 1 above. Preferably, the modulated signal is a PWM signal, and the adjustment of the modulated signal comprises adjusting the duty cycle of at least one PWM signal driving LEDs 40.

In stage 1030, the optical output of the luminaire driven by the modulated signal of stage 1020 is sampled on an individual frame basis, or less than an individual frame basis. In one embodiment, LPF 60 of FIGS. 2, 3 is designed so as to output an average luminance over a lighting portion of a frame, and synchronizer 120 is operative to sample the output of LPF 60 via A/D converter 70 so as to output a sample representative of the average luminance of the lighting portion of the frame. In another embodiment, A/D converter 70 samples the optical output each PWM cycle of PWM controller 20 when LED driver 30 is enabled, responsive to synchronizer 120. Preferably, in such an embodiment LPF 60 is replaced with an integrator arranged to present the overall energy of the PWM cycle to A/D converter 70.

In stage 1040, one of the sampled output of stage 1030 and the received reference of stage 1000 is scaled by the value of the received luminance setting signal of stage 1010 so as to be consonant with the other. The error signals output by difference generator 100 of FIGS. 2, 3 are thus independent of the luminance value set by the received luminance setting signal of stage 1010, and the slow color loop comprising feedback controller 110 is thus enabled irrespective of the changing luminance setting signal on a per frame basis. In stage 1050, the scaled value is compared with the non-scaled value, and a difference generated thereby enabling the slow color loop. In the event of an embodiment in accordance with the implementation of FIG. 2, the scaled reference value set is compared with non-scaled sampled set. In the event of an embodiment in accordance with the implementation of FIG. 3, the non-scaled reference value set is compared with scaled sampled set.

Figure 5:
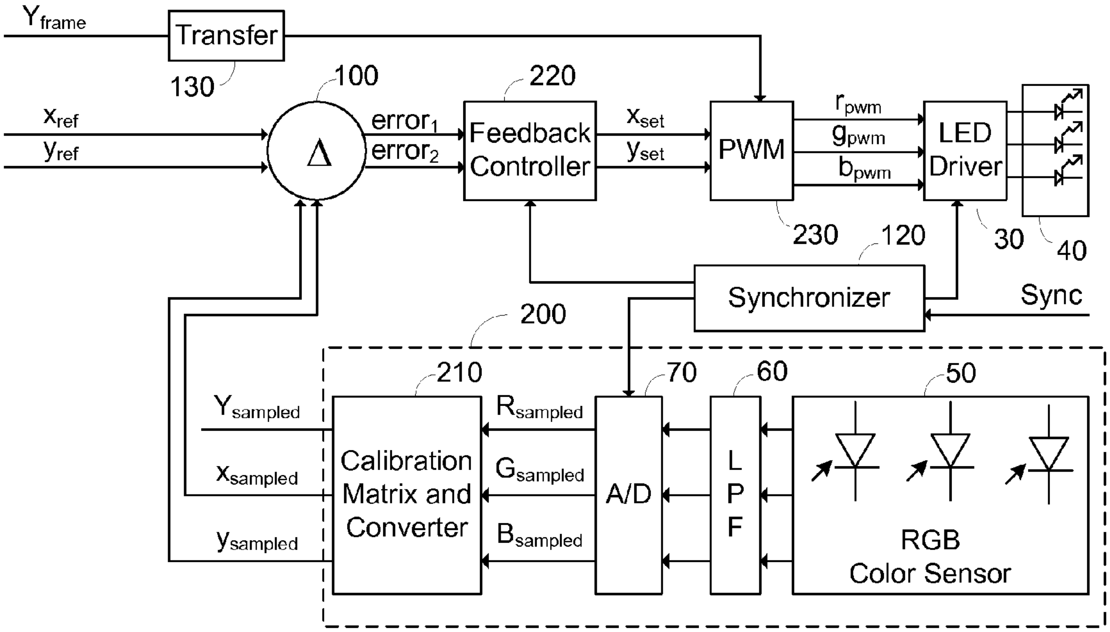
FIG. 5 illustrates a high level block diagram of a third embodiment of a color control loop for LED backlighting exhibiting a direct luminance setting input in accordance with a principle of the current invention, in which the luminance setting is removed from the color loop.

FIG. 5 illustrates a high level block diagram of a third embodiment of a color control loop for LED backlighting exhibiting a direct luminance setting input in accordance with a principle of the current invention, in which the luminance setting is removed from the color loop comprising: a PWM generator 230; an LED driver 30; a plurality of LED strings 40 comprising red, blue and green LED strings; an optical sampler 200 comprising an RGB color sensor 50, a low pass filter 60, an A/D converter 70 and a calibration matrix and converter 210; a difference generator 100; a feedback controller 220; and a synchronizer 120.

PWM generator 230 is arranged to output a PWM red LED signal denoted $r_{pwm}$, a PWM green LED signal denoted $g_{pwm}$, and a PWM blue LED signal denoted $b_{pwm}$. LED driver 30 is arranged to receive $r_{pwm}$, $g_{pwm}$ and $b_{pwm}$ and drive the respective red, blue and green plurality of LED strings 40 responsive to the respective received $r_{pwm}$, $g_{pwm}$ and $b_{pwm}$. RGB color sensor 50 is in optical communication with the output of the plurality of LED strings 40 and is operative to output a plurality of signals responsive to the optical output of LED strings 40. Low pass filter 60 is arranged to received the output of RGB color sensor 50 and reduce any noise thereof by only passing low frequency signals. A/D converter 70 is arranged to receive the output of low pass filter 60 and output a plurality of sampled and digitized signals thereof denoted respectively, $R_{sampled}$, $G_{sampled}$ and $B_{sampled}$, the sampling and digitizing being responsive to synchronizer 120. Calibration matrix and converter 210 is arranged to receive $R_{sampled}$, $G_{sampled}$ and $B_{sampled}$ and output a plurality of calibration converted sampled signals denoted respectively $x_{sampled}$, $y_{sampled}$ and $Y_{sampled}$. Calibration matrix and converter 210 thus converts $R_{sampled}$, $G_{sampled}$ and $B_{sampled}$ to a colorimetric system consonant with colorimetric system of the received color target reference signals described further below, in which the luminance value, denoted Y, has been segregated from the correlated color temperature value, denoted x, y. The above has been described in relation to the CIE 1931 color space, however this is not meant to be limiting in any way. Use of other color spaces, including but not limited to the CIE LUV color space, and the CIE LAB color space are specifically incorporated herewith. Thus, optical sampler 200 is in optical communication with LED strings 40 and outputs a signal representative thereof of the correlated color temperature output thereof.

Difference generator 100 is arranged to receive a plurality of color target reference signals denoted respectively $x_{ref}$, $y_{ref}$ and the set of $x_{sampled}$, $y_{sampled}$ and output a plurality of error signals denoted respectively $error_1$ and $error_2$ reflective of any difference thereof. Feedback controller 110 is arranged to receive $error_1$, $error_2$ and output a plurality of PWM control signals denoted respectively $x_{set}$, $y_{set}$ to control the duty cycle of the respective PWM signals of PWM generator 230 in cooperation with a received luminance signal, $Y_{frame}$. PWM generator 230 is arranged to receive $error_1$ and $error_2$ and luminance signal $Y_{frame}$ and output $r_{pwm}$, $g_{pwm}$ and $b_{pwm}$ responsive thereto, exhibiting the appropriate color and luminance levels. LED strings 40 may be replaced with red, green and blue LEDs without exceeding the scope of the invention.

Each of feedback controller 220, LED driver 30 and, as indicated above, A/D converter 70 receives a respective output of synchronizer 120. Feedback controller 220 is typically implemented as a PID controller requiring a plurality of steps to settle at the revised value. Synchronizer 120 is operative to: enable LED driver 30, responsive to a received Sync signal, during the appropriate portion of the frame; allow for propagation of the output of LED driver 30 through LED strings 40, RGB color sensor 50 and LPF 60 prior to sampling the output of LPF 60 by A/D converter 70; allow for settling of the output of A/D converter 70 with the sampled output of LPF 60, propagation through calibration matrix and converter 210 and propagation through difference generator 100; and step feedback controller 220 with resultant sampled output of LED strings 40. Thus, synchronizer 120 controls A/D converter 70 and feedback controller 220 to ensure that the change in luminance of LED strings 40 responsive to the received luminance setting input at PWM generator 230 impacts the input of feedback controller 220 prior to stepping feedback controller 220.

Transfer function converter 130 is operative to compensate for any non-linearity in the response of LED strings 40 to a change in PWM setting. Thus, in the event of a purely linear response of luminance to a dimming or boosting factor, transfer function converter 130 acts as a pass through. In the event of any non-linearity, transfer function converter 130 acts to provide the PWM to luminance transfer function, which in one embodiment is stored in a look up table, and in another embodiment is implemented as a direct transfer function.

In operation, a host system, or a non-volatile memory, set at an initial calibration, outputs $x_{ref}$ and $y_{ref}$, thereby setting the desired white point, or other correlated color temperature of LED strings 40. Luminance setting input signal, $Y_{frame}$, preferably responsive to a video processor on a frame by frame basis, is operative to set the overall luminance on a frame by frame basis without affecting the desired white point or other correlated color temperature setting by directly inputting the luminance setting input to PWM generator 230. The color loop of FIG. 5, does not close a luminance loop, since $Y_{sampled}$ is not compared to $Y_{frame}$, and thus over time the luminance may drift as a consequence of aging. The luminance setting input signal $Y_{frame}$ is preferably further responsive to a user input, preferably as an input to the video processor, or by scaling the output of the video processor without exceeding the scope of the invention. Thus, the user closes a feedback loop of the luminance by adjusting the luminance user input.

The color loop is impervious to the luminance setting signal value, since all luminance information is segregated into $Y_{frame}$. Difference generator 100 compares $x_{ref}$ and $y_{ref}$ respectively with $x_{sampled}$ and $y_{sampled}$, and outputs error signals $error_1$ and $error_2$ reflective of the respective difference thereof. Feedback controller 220 is operative in cooperation with PWM generator 230, RGB color sensor 50 and calibration matrix and converter 210 to close the color loop thereby maintaining the light output by LED strings 40 consonant with color target reference signals $x_{ref}$ and $y_{ref}$. Synchronizer 120 acts to enable LED driver 30 during the appropriate portion of the frame, clock A/D converter 70 so as to sample the optical output during the active portion of the frame, and step feedback controller 220 responsive to the clocked sample optical output. In one embodiment, A/D converter 70 samples the optical output each PWM cycle of PWM controller 230 when LED driver 30 is enabled, responsive to synchronizer 120. Preferably, in such an embodiment LPF 60 is replaced with an integrator arranged to present the overall energy of the PWM cycle to A/D converter 70.

Thus, the arrangement of FIG. 5 enables immediate luminance setting responsive to the luminance setting input signal, without affecting the slow acting color loop.

The above embodiment has been explained in reference to an embodiment in which LEDs 40 are driven by a PWM signal, whose duty cycle is controlled so as to accomplish both dimming or boosting and control of the color correlated temperature, however this is not meant to be limiting in any way. In another embodiment LEDs 40 are adjusted by one or more of a resonance controller and amplitude modulation to control at least one of dimming or boosting and the color correlated temperature without exceeding the scope of the invention.

Figure 6:
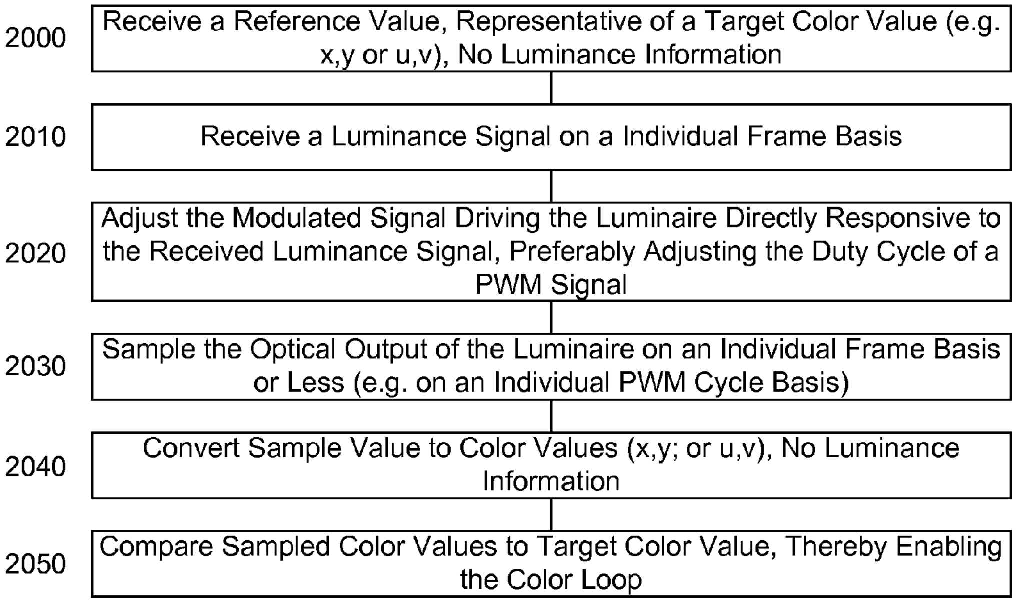
FIG. 6 illustrates a high level flow chart of a method according to a principle of the invention to enable color control by a slow color loop and per frame luminance setting in cooperation with the embodiment of FIG. 5.

FIG. 6 illustrates a high level flow chart of a method according to a principle of the invention to enable color control by a slow color loop and per frame luminance setting in cooperation with the embodiment of FIG. 5. In stage 2000, a reference value is received, the received reference value being representative of a target color correlated temperature without luminance information, such as an x,y value or an a,b value, without limitation. In one embodiment the received reference value represents a white point.

In stage 2010, a luminance setting input signal is received, also known as a frame luminance value, such as a Y or L value, the received luminance setting signal defining the desired luminance of the backlight, or a particular zone of the backlight, on an individual frame basis. The luminance setting signal may be a dimming signal or a boosting signal in reference to a base value without exceeding the scope of the invention. Thus, the reference value of stage 2000 is invariant between frames, while the luminance frame luminance value signal of stage 2010 is variable on a frame by frame basis. There is no requirement that the luminance setting signal be varied for each frame, and a plurality of contiguous frames exhibiting an unchanged luminance setting may be exhibited without exceeding the scope of the invention. There is no requirement that that reference values of stage 2000 be permanently fixed, and changes to the reference values of stage 2000 may occur, albeit preferably not on a frame by frame basis, without exceeding the scope of the invention.

In stage 2020, the modulated signal driving a luminaire is adjusted directly responsive to the received luminance setting signal of stage 1010. The term directly responsive as used herein, is meant to indicate that the luminance of the luminaire is adjusted responsive to the changed luminance setting signal as opposed to luminance change occurring primarily through action of the slow color loop as described in relation to FIG. 1 above. Preferably, the modulated signal is a PWM signal, and the adjustment of the modulated signal comprises adjusting the duty cycle of at least one PWM signal driving LEDs 40.

In stage 2030, the optical output of the luminaire driven by the modulated signal of stage 2020 is sampled on an individual frame basis, or less than an individual frame basis. In one embodiment, LPF 60 of FIG. 5 is designed so as to output an average luminance over a lighting portion of a frame, and synchronizer 120 is operative to sample the output of LPF 60 via A/D converter 70 so as to output a sample representative of the average luminance of the lighting portion of the frame. In another embodiment, A/D converter 70 samples the optical output each PWM cycle of PWM controller 20 when LED driver 30 is enabled, responsive to synchronizer 120. Preferably, in such an embodiment LPF 60 is replaced with an integrator arranged to present the overall energy of the PWM cycle to A/D converter 70.

In stage 2040, the sampled optical output is converted to a calorimetric system consonant with the input reference values of stage 2000. Luminance information is optionally discarded. In stage 2050, the converter value is compared with the reference value, and a difference generated thereby enabling the slow color loop. Luminance values are not feedback, and thus operate on an open loop orthogonal to the closed color loop.

Thus the present embodiments enable, in one embodiment, a modulation signal generator driving constituent LEDs of a backlight luminaire to be directly responsive to a luminance setting input, which is variable on an individual frame basis. Thus, the overall luminance of the LEDs is immediately responsive to the luminance setting output of a video processor. A slow acting color loop is unaffected by the changing luminance from frame to frame by scaling one of the reference target values and the sampled optical output.

In another embodiment, the luminance setting per frame is segregated from the target color value, and the modulation signal generator driving the constituent LEDs of the backlight luminaire is arranged to be directly responsive to luminance setting input, which is variable on an individual frame basis. The slow acting color loop is unaffected by the changing luminance from frame to frame. In one further embodiment the luminance value is not operated in a closed loop fashion.

The luminance setting per frame may be presented by a dimming signal or a boosting signal without exceeding the scope of the invention. The luminance setting per frame may presented as an analog or a digital signal without exceeding the scope of the invention.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A method of controlling the luminance of a luminaire on an individual frame basis, without affecting a color loop controlling the luminaire, the method comprising:

receiving a reference value defining a target correlated color temperature;

receiving a luminance setting defining a target luminance of the luminaire per frame;

adjusting, directly responsive to said received luminance setting, the modulation of a modulated signal driving the luminaire thereby controlling the luminance of the luminaire per frame; and sampling the optical output of the luminaire at least once per frame.

2. A method according to claim 1, further comprising:

comparing a function of the sampled optical output with said received reference value to produce an error signal; and adjusting said modulation of said modulated signal to reduce said error signal.

3. A method according to claim 1, further comprising:

scaling one of said received reference value and said sampled optical output by a value associated with said received luminance setting input signal;

comparing said scaled one of said received reference value and said sampled optical output with said non-scaled one of received reference value and said sampled optical output to produce an error signal; and adjusting said modulation of said modulated signal to reduce said error signal.

4. A method according to claim 1, wherein the modulated signal is a pulse width modulated signal and wherein said adjusting the modulation of the modulated signal comprises adjusting a duty cycle of said pulse width modulated signal.

5. A method according to claim 3, wherein the luminaire comprises light emitting diodes of a plurality of colors, and wherein said adjusting the modulation of the modulated signal comprises adjusting a duty cycle of each of said light emitting diodes of said plurality of colors.

6. A method according to claim 1, wherein said sampling the optical output comprises converting said sampled output by a calibration matrix to be consonant with a colorimetric system of said received reference value.

7. A method according to claim 1, wherein the modulated signal is a pulse width modulated signal exhibiting a cycle, and wherein said sampling is per cycle of said pulse width modulated signal.

8. A backlight luminaire controller comprising:

a means for receiving a luminance setting signal defining a luminance of a backlight luminaire on an individual frame basis;

a means for receiving a reference value defining a target color temperature;

a feedback controller requiring a plurality of frames to converge;

a modulated signal generator immediately responsive to said received luminance setting signal and said feedback controller;

an optical sampler arranged to output a signal, on at least said individual frame basis, representative of the optical output of a backlight luminaire driven responsive to said modulated signal generator;

a scaler arranged to scale, by a scaling factor responsive to said received luminance setting signal, a first one of said received reference value and said output signal of said optical sampler to be consonant with a second one of said received reference value and said output signal of said optical sampler; and a difference circuit, arranged to output a signal representative of the difference between the output of said scaler and the output of said second one of said received reference value and said output signal of said optical sampler, said feedback controller responsive to said output signal of said difference circuit to output a signal operative to reduce said difference.

9. A backlight luminaire controller according to claim 8, wherein said modulated signal generator is a pulse width modulation generator, and wherein said feedback controller outputs a signal adjusting a duty cycle of said pulse width modulation generator.

10. A backlight luminaire controller according to claim 9, wherein said pulse width modulation generator exhibits a cycle and wherein said optical sampler is arranged to output a signal per cycle of said pulse width modulation generator.

11. A backlight luminaire controller according to claim 10, wherein said optical sampler comprises an integrator.

12. A backlight luminaire controller according to claim 9, wherein the backlight luminaire comprises light emitting diodes of a plurality of colors, and said pulse width modulation generator outputs a pulse width modulated signal exhibiting a duty cycle for each of said light emitting diodes of said plurality of colors.

13. A backlight luminaire controller according to claim 8, wherein said optical sampler comprises a calibration matrix operative to convert said sampled output to be consonant with a colorimetric system of said received reference value.

14. A method of controlling the luminance of a luminaire on an individual frame basis, without affecting a slow acting color loop controlling the color temperature of the luminaire, the method comprising:

receiving a reference value representative of a target color;

receiving a luminance signal defining the luminance of the luminaire per frame;

adjusting a modulated signal driving the luminaire directly responsive to said received luminance signal, thereby controlling the luminance of the luminaire per frame;

sampling the optical output of the luminaire per frame;

comparing a value responsive to said sampled optical output with a value responsive to said received reference value to output a difference signal; and further adjusting said modulated signal driving the luminaire responsive to said compared value so as to reduce said difference signal.

15. A method according to claim 14, wherein said modulated signal is a pulse width modulated signal.

16. A method according to claim 15, wherein said adjusting the modulated signal comprises adjusting the duty cycle of said pulse width modulated signal.

17. A method according to claim 15, wherein the luminaire comprises light emitting diodes of a plurality of colors, and said adjusting the pulse width modulation signal comprises adjusting a duty cycle of each of said light emitting diodes of said plurality of colors.

18. A method according to claim 14, further comprising:

scaling one of said received reference value and said sampled optical value by a value associated with said received luminance signal, wherein said comparing a value comprises comparing said scaled one of said received reference value and said sampled optical value with said non-scaled one of received reference value and said sampled optical value.

19. A method according to claim 14, wherein said sampling the optical output comprises converting said sampled output by a calibration matrix to be consonant with a colorimetric system of said received reference value.

20. A method according to claim 14, wherein the modulated signal is a pulse width modulated signal exhibiting a cycle, and wherein said sampling is per cycle of said pulse width modulated signal.

21. A backlight luminaire controller comprising:

a feedback controller requiring a plurality of frames to converge;

a modulated signal generator immediately responsive to a received luminance setting signal and said feedback controller;

an optical sampler arranged to output a signal, on at least said individual frame basis, representative of the optical output of a backlight luminaire driven responsive to said modulated signal generator;

a scaler arranged to scale a first one of a received reference value and said output signal of said optical sampler to be consonant with a second one of said received reference value and said output signal of said optical sampler, said received reference value defining a target color temperature; and a difference circuit, arranged to output a signal representative of the difference between the output of said scaler and the output of said second one of said received reference value and said output signal of said optical sampler, said feedback controller responsive to said output signal of said difference circuit to output a signal operative to reduce said difference.

* * * * *